United States Patent [19]
Brockman et al.

[11] Patent Number: 5,185,977
[45] Date of Patent: Feb. 16, 1993

[54] STORAGE TERMINAL SHELTER, INCLUDING SIDE CURTAIN ASSEMBLY FOR TRUCK/TRAILER HINGE GAP CLOSURE

[75] Inventors: Thomas R. Brockman, Kenton; Mark Dillon, Upper Sandusky, both of Ohio

[73] Assignee: Fairborn USA Inc., Upper Sandusky, Ohio

[21] Appl. No.: 880,415

[22] Filed: May 8, 1992

[51] Int. Cl.⁵ ............................................. E04H 14/00
[52] U.S. Cl. .................................. 52/173 DS; 52/70; 52/71; 49/504
[58] Field of Search ................... 52/173 DS, 173, 20, 52/71; 49/504

[56] References Cited

U.S. PATENT DOCUMENTS

| | | | |
|---|---|---|---|
| 4,070,801 | 1/1978 | O'Neal | 52/2 |
| 4,494,341 | 1/1985 | Schwab | 52/173 DS |
| 4,671,029 | 6/1987 | Bennett et al. | 52/173 S |
| 4,682,382 | 7/1987 | Bennett | 14/71.3 |
| 4,785,594 | 11/1988 | Alten | 52/173 DS |

*Primary Examiner*—Richard E. Chilcot, Jr.
*Assistant Examiner*—Matthew E. Leno
*Attorney, Agent, or Firm*—David H. Semmes

[57] ABSTRACT

A loading dock shelter with hinge gap closure wherein reinforced side curtains seal corner/hinge areas, as a truck/trailer is backed into a loading dock, to thereby form a protective weather seal. Hinge gap closures having side curtains for right and left portions of the shelter are each adapted to set the curtains parallel to the door of the dock in the normal position, when the dock is not in use, thereby protecting the door from inclement weather, etc. When a trailer is moved into the dock, reverse mobility of the vehicle is such as to cause the side curtains to be deflected from normal inoperative position, to extend them along the side of the respective trailer swing doors, whereby a collapsible wedge on the extreme extension of each curtain encompasses the gas created by the truck and its swing door, in sealing contact, preparatory to and during loading and off-loading. An articulated hinge functions to close against the side frame of the shelter when not in use and when in use to extend itself arcuately inward from the side frame of the shelter toward the trailer body and its swing door. Its attached side curtain is extended inwardly to seal the gap between trailer and shelter. A coactive fabric filler of the assembly is also provided to seal any gap remaining between hinge leaf elements and shelter side wall.

8 Claims, 3 Drawing Sheets

STORAGE TERMINAL SHELTER, INCLUDING SIDE CURTAIN ASSEMBLY FOR TRUCK/TRAILER HINGE GAP CLOSURE

BACKGROUND OF THE INVENTION

In the loading and off-loading of trucks, more specifically, tractor-trailor trucks, it is desirable to seal the area between terminal dock and/or shelter against inclement weather. At the same time, it is important to provide such combined dock seal and shelter as will be able to withstand substantial abuse, as for example: getting hit by pallets and forklifts. Also, from the outside, the dock and/or shelter gets abused by everything from rough weather to sharp gadgets and projections rendering the dock seal and shelter exposed to extraordinary wear and tear. Accordingly, the present invention is adapted to provide at a given warehouse or building dock, a protective unit that provides a weather-tight seal when compressed by trailer or truck, wherein its rear doors are open and folded back along the sides of the truck and/or trailer. It is desirable that such a dock shelter not only permit complete and unobstructed trailer access, but also provide outstanding weather protection, the shelter being mounted along the outer perimeter of the door opening of the warehouse or terminal building. It is imperative that such a shelter permit free access, while a side curtain assembly for trailer hinge gap closure is closed upon the sides during truck/trailer entry; likewise the vehicle should be sealable by head curtain within the shelter. More specifically, the invention is a hinge gap closure unit which may be retrofitted to existing storage shelters in truck/trailer loading and off-loading. The unit is sufficiently versatile to accommodate a truck trailer which is out of position relative to a dock center as defined by the building construction. The dock center is determined by bumpers and dock sills which are operatively disposed, adjacent the door opening of the building.

DISCUSSION OF THE PRIOR ART

There follows a listing of the patented art as it relates to the side curtain assembly for trailer hinge gap closure of this invention:

| | |
|---|---|
| FROMMELT 10/28/75 | 3,915,183 |
| FROMMELT 6/22/86 | 4,601,142 |
| BENNETT 1/27/87 | 4,638,612 |
| LAYNE 12/08/87 | 4,711,059 |
| FROMMELT 2/21/89 | 4,805,362 |

In none of the afore-cited patents is the combination of applicant's shelter with hinge gap closure shown or described, reference the following description, drawings and claims.

SUMMARY OF THE INVENTION

Every time one opens a warehouse loading door to gain access to a trailer, there is a transfer of inside and outside air that causes an energy loss. And with an open, unsealed 8'×8' loading door, this may currently cost some thousands of dollars a year per door in heating loss and in excess of a thousand dollars a year per door in air conditioning losses. (Research reported by Plant Engineering, May 1984.) The present form fitting dock seal units are retrofitted to existing shelters to present an effective barrier between two listed environments, while permitting materials handling personnel unobstructed access to the trailer and its contents.

This is a loading dock shelter with hinge gap closure wherein reinforced side curtains seal corner/hinge areas, as a trailer is backed into a loading dock, to thereby form a protective weather seal. Excessive pull on the side curtains is compensated by a pair of spring-loaded articulated hinge assemblies, connecting the curtains to the front member of existing shelter side frames. The present hinge gap closures having side curtains for right and left portions of the shelter are each adapted to set the curtains parallel to the door of the dock in the normal position, when the dock is not in use, thereby protecting the door from inclement weather, etc. When in use, that is to say, when the trailer is in the dock, the reverse mobility of the truck/trailer is such as to cause the side curtains to be deflected from normal inoperative position, and to extend the curtains along the side of the respective trailer swing doors, whereby a collapsible wedge on the extreme extension of each curtain encompasses the gap created by the truck and its swing door, in sealing contact, preparatory to and during loading and off-loading. To effect these functions, an articulated hinge functions to close against the side frame of the shelter when not in use and when in use to extend itself arcuately inward from the side frame of the shelter toward the trailer body and its swing door. Its attached side curtain is extended inwardly toward the door to seal the gap between trailer and shelter. A coactive fabric filler of the assembly is also provided. The side curtain draws from the side frame of the shelter to operative position, to fill all exposed portions of the gap between terminus of the side curtain and the side frame of the shelter. Thus a complete seal is presented as between the trailer which may or may not be centered in the dock. As indicated, the side curtain assembly includes as one of its principal elements an articulated hinge, one anchor portion of which reposes in fixed relation to the side frame of the shelter and the other portion of which is free to move arcuately and laterally or sidewise of the shelter projection to accomplish the curtail closure function, previously enumerated.

DESCRIPTION OF THE PREFERRED EMBODIMENTS

A conventional terminal building defines a door with a conventional overhang atop and appropriate vehicle bumpers below dock. Existing shelter side frames are secured right and left of the door, outwardly of the bumpers. These side frames are held up by shelter supports which in turn are secured rearwardly on the building.

A shelter, formed to protect the open end of a docked truck/trailer rests upon the support at the dock bottom and has rooftop support on the building beneath its overhang to which it is attached by conventional means.

Whereas shelter would appear to comprise a conventional loading dock shelter having side frames attached to the building and shelter supports, its interior varies substantially from the norm. Protruding from the existing building is a reinforced head curtain 110 with depending side curtains 120, the head and side curtains being secured to shelter side frames 150. The unit of the shelter is, as indicated, substantially greater in lateral dimension than the door of the building, its side frame assemblies resting upon the shelter supports. Characteristically, the height of the shelter is thus substantially greater than the door height and the shelter unit width is substantially greater than the building door width. The unit projects a conventional distance from the building at its top and bottom and optionally supports at the top, either an inflatable head bag or a flexible head curtain to create a seal against the top of the trailer.

Figure 1:
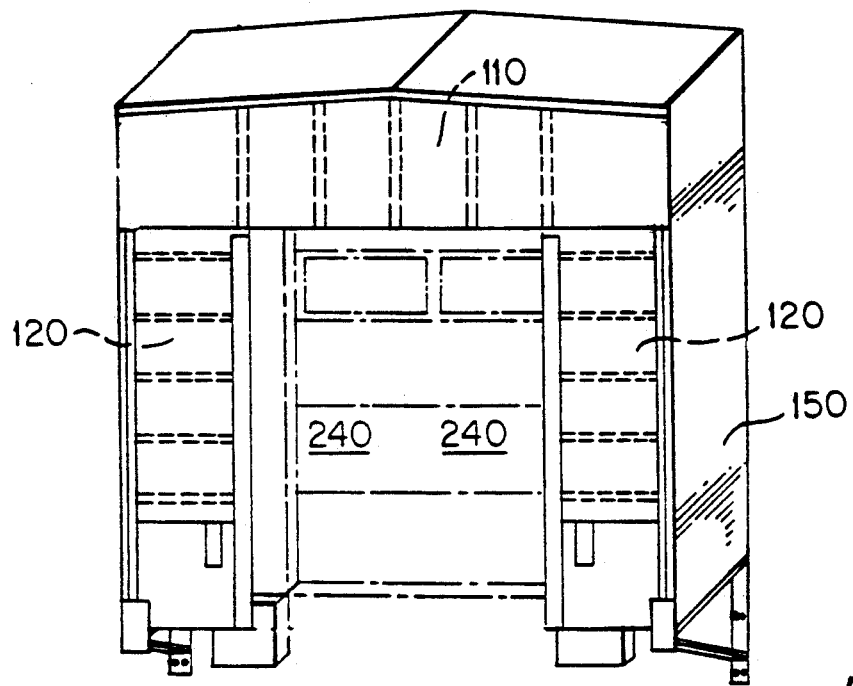
FIG. 1 is a view in perspective of a dock shelter with hinge gap closures, according to the invention.
Figure 2:
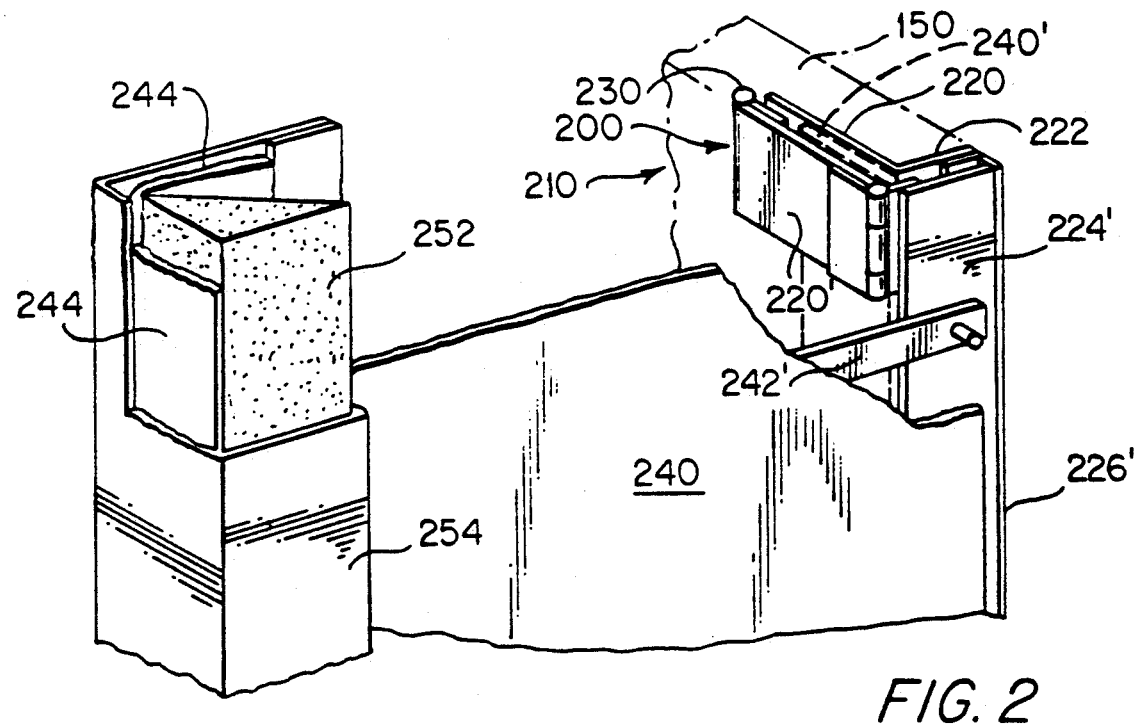
FIG. 2 is a schematic and partial view in perspective, showing the relative position of right-hand elements of the FIG. 1 invention, including hinge assembly with side curtain and wedge, extended, inoperative mode.
Figure 3:
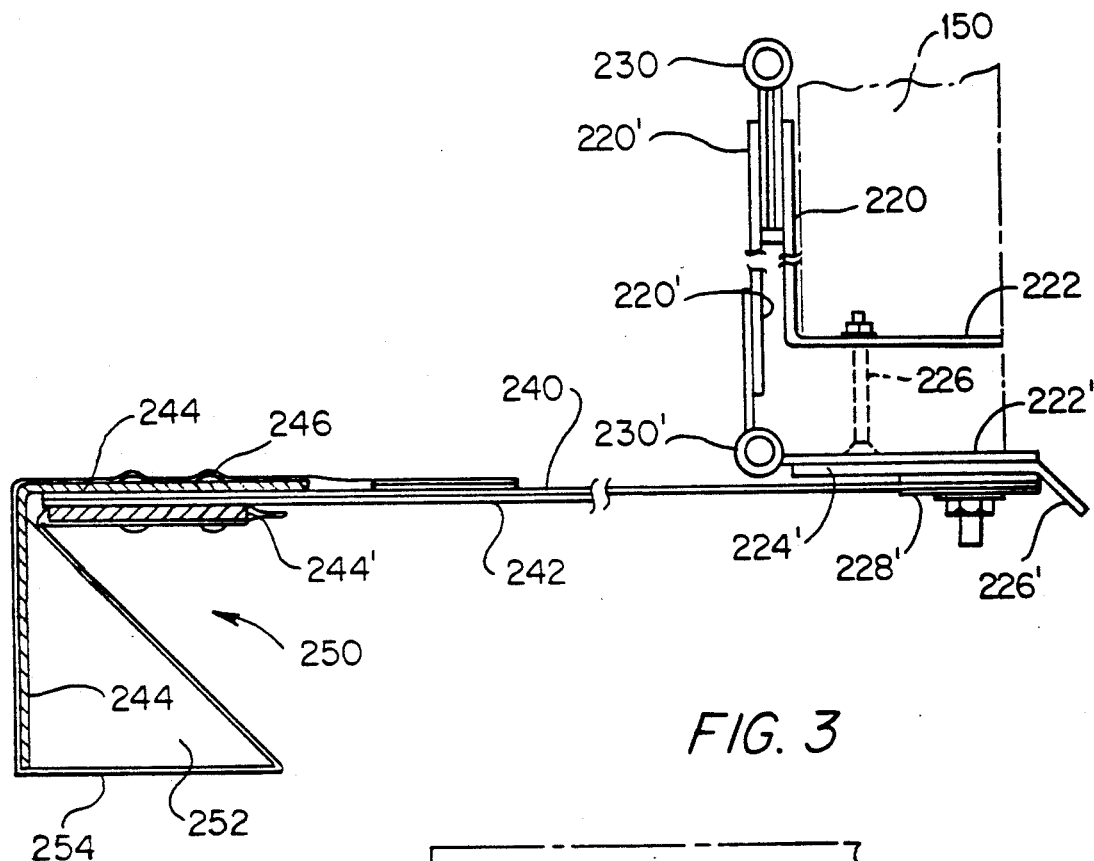
FIG. 3 is an enlarged top plan view of the invention depicted in FIGS. 1 and 2, illustrating inoperative mode.

To identify the elements in unit hinge assembly 200, there is the hinge 210 which comprises opposed clamping leaves 220-220', the same having hinge connection with spring loaded joint 230. The hinge is spring-loaded in both compression and extension modes, as when the side curtain is in normal or extended position. See FIGS. 2 and 3, FIG. 3 illustrating the closed mode.

A return spring assembly 160 is anchored at its far end to the shelter side frame and by pulley connection, its leader passes through an aperture in fixed leaf 220 to engage the opposed and movable leaf 220' at its rear end. In the inoperative position spring 160 is lightly extended and in the operative position it is substantially extended. Fixed by weldment or otherwise to the clamping leaf 220 is anchor extension 222, the extension being bent at a 90° angle to fit and secure onto a receptor butt end of side frame 150 by anchor bolt 226 or by weld attachment when utilizing steel frames. See FIGS. 3 and 4. Its opposite counterpart, hinge articulator extension 222', is likewise connected to the opposed leaf 220'. Affixed to extension 222' is articulating leaf 224', these elements having connection to articulating joint 230'. Joint 230' is helicalcoil spring loaded. Hinge leaf 224' has on its free end a vertically extending flange 226' which is set at a 45° angle relative to leaf 224'. To this vertically extending hinge leaf 224', the rear end of side curtain is affixed by means of threaded studs, nuts and a trim strip 228'.

The side curtain 240 defines at least one transverse stay pocket 242 containing a fiberglass stay 242' which is preferably reinforced by a contiguous stay. The stays are set transversely of the device at a rear end to leaf extension 224', both curtain and stays being terminated at their far end by a vertically extending seal retainer 244. This retainer in conjunction with clamping plate 244' is held by suitable rivets 246, extending up and down the vertical length of the curtain 240. Seal retainer 244 supports by chemical adhesive or other means seal assembly 250.

A collapsible seal 252 is formed of a spongeous foam. This foam being of triangular section, is wrapped by a durable, fabric cover 254 which can withstand substantial abuse from an open truck/trailer, backing and moving into and out of position with respect to the building dock door. The cover 254 is held at its inner end by means of the seal retainer 244 and clamping plate 244', rivets 246 passing through. On its outter end, VELCRO TM provides a suitable vertically extending anchor for joining seal cover and curtain.

Figure 4:
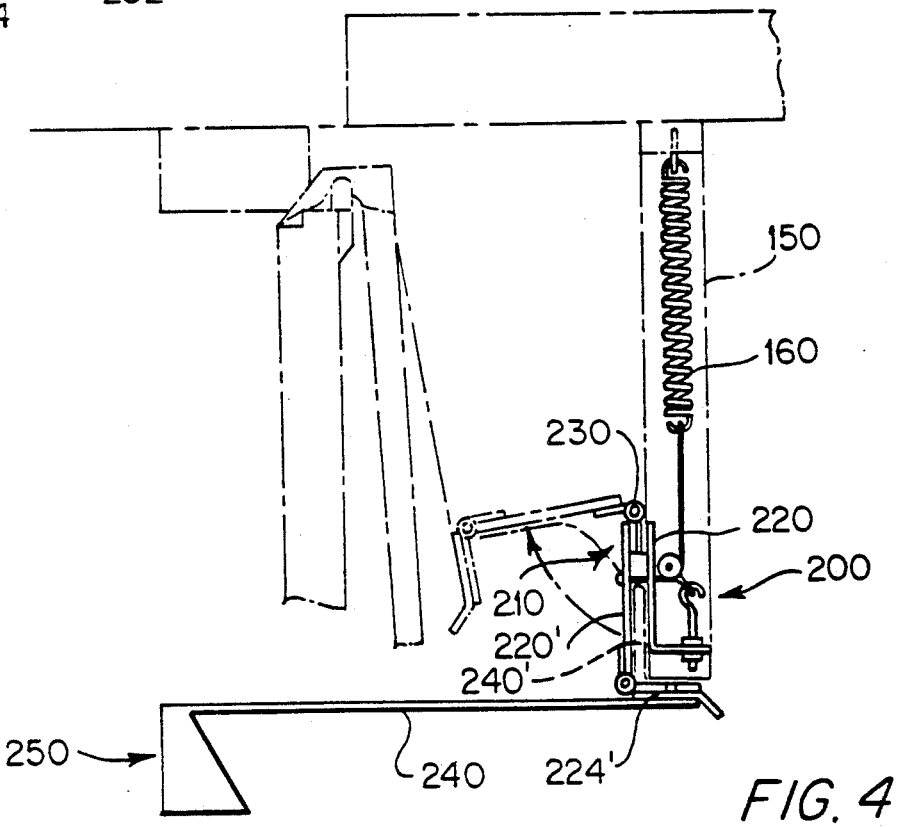
FIG. 4 is a view in top plan, depicting the unit assembly in the stages of its operative gap closing function.
Figure 5:
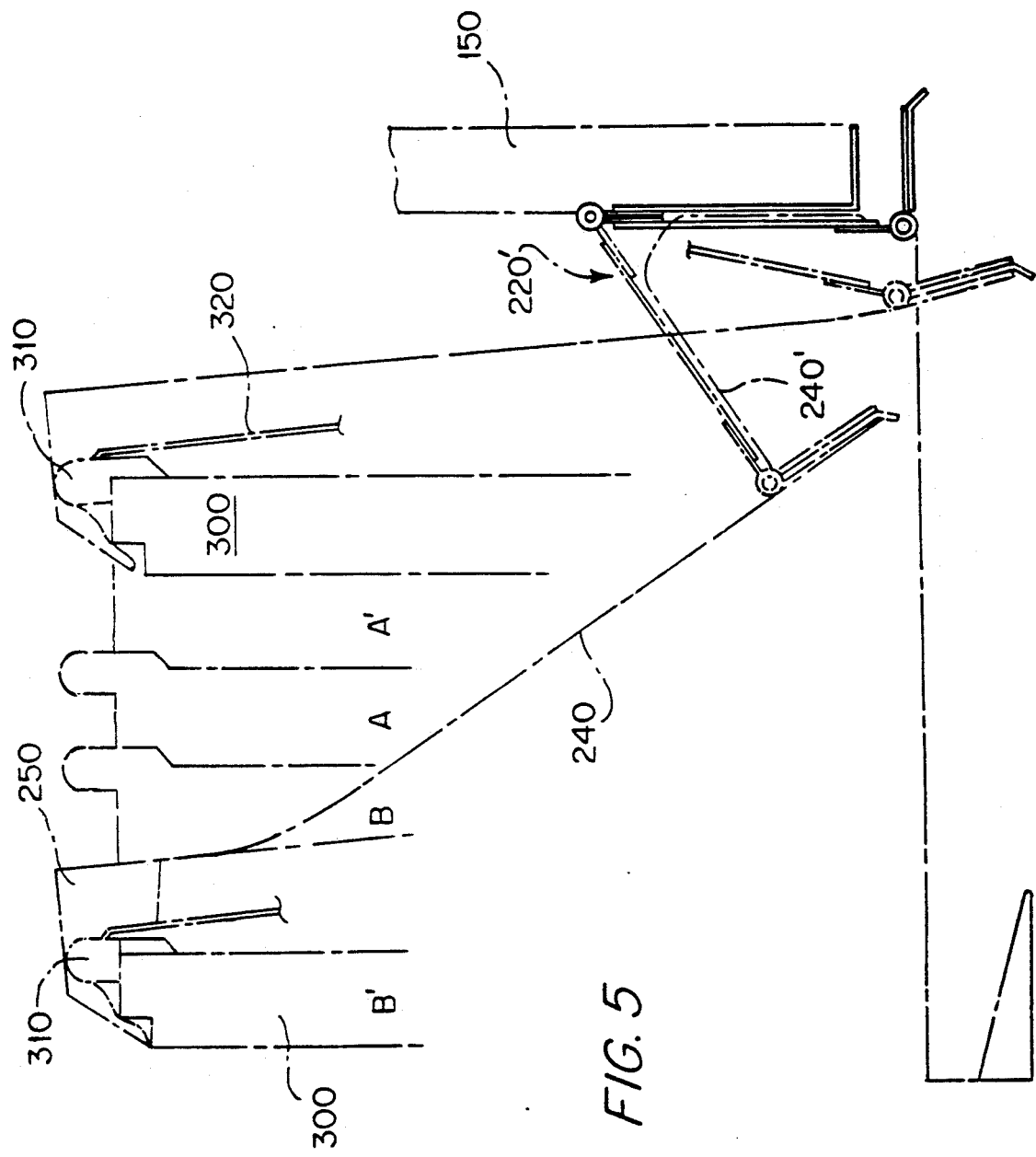
FIG. 5 is an enlarged schematic view illustrating the operative function of FIG. 4 wherein the truck/trailer is displaced right and/or left of dock center.

In FIG. 4, the basic operative function of the side curtain assembly 200 appears, schematically. To depict the function more realistically, it is important to consider whether or not the truck/trailer 300 may be centered in the dock or out of position, viz., to the right or to the left of center. It will be apparent that when the trailer is out of position to the right, the angle between movable hinge leaf and shelter side wall projection is small; whereas, when the trailer is out of position to the left, the angle between movable hinge leaf and shelter is comparatively greater. See FIG. 5. In the former instance, the gap between trailer door and wall is small and vice versa.

More specifically, as vehicle 300 having hinge 310 and door 320 may have been backed into docking position A', this is offset to the right of dock center position A and the hinge assembly 200 with curtain 240 is positioned by truck hinge impinging upon seal 250 into the position A. Here the actuation of hinge is lesser when compared to the position B' wherein the vehicle 300, its hinge 310 and door 320 are offset to left of dock center B.

In operation, as the hinge assembly 200 responds to vehicular pull on the curtain, the trailer being out of position to the right of dock center, the articulable leaf component 220' moves arcuately outwardly. Its extensions 222' and 224' which secure the fabric gap filler 240' are pulled transversely from the position of repose into that shown as the intermediate position on the schematic diagram of FIG. 5. On the contrary, as the truck/trailer may move out of position to the left of dock center, the articulable portion 222'-226' of the hinge is pulled to the extreme upper position, whereby the gap between truck and door is not only filled, but also the gap between the articulable portion of the main hinge assembly is likewise filled by fabric gap filler 240' it being attached to the movable segment 220' of the hinge, as well as the fixed segment 220. By virtue of the compressed characteristic of the respective joints 230-230', these elements when no trailer is present at dock, will move to the position of repose first shown and described relative to the shelter projection, viz., the inoperative position. Likewise, the gap closing functions of curtain 240 and seal 250 are clearly depicted in the respective positions illustrated in FIG. 5.

We claim:

1. The combination with a storage terminal having dock, door and truck/trailer shelter, said shelter comprising opposed shelter side frames fixed to the terminal, and a shelter side curtain assembly adjacent said dock for truck/trailer hinge gap closure, comprising:

a) at least one compressible truck/trailer hinge unit, including opposed leaves, a first leaf thereof being anchored to one of said shelter side frame and a second leaf thereof being free and articulable relative to the first leaf, said unit including extension-compression means, fixed to the shelter side frame, restraining the second leaf, relative to the first leaf and the side frame;

b) at least one side curtain secured at a near end thereof to the second leaf for movement relative to the first leaf, said curtain being laterally reinforced by stays;

c) compressible hinge gap closure seal retained by the side curtain on a far end thereof, said seal being resiliently held by the side curtain, whereby upon rearward displacement of the reinforced curtain by the truck/trailer, the second leaf will be displaced rearwardly and any gap existing between truck/trailer body and door will be closed, relative to the shelter side frame.

2. The combination of claim 1 wherein the second leaf includes an articulable leaf extension to which the reinforced side curtain is attached for coactive articulation, relative to the second hinge leaf, to compensate thereby for offset location of the truck/trailer, relative to the terminal dock.

3. The shelter side curtain assembly of claim 1 or 2, further comprising a fabric gap filler engaging said first and second leaves of the hinge assembly in containment expansion disposition, to effect closure of the gap created between respective leaves of the hinge assembly, upon actuation of the reinforced curtain.

4. The truck/trailer shelter of claim 1 wherein plural hinge unit assemblies are disposed in vertical alignment, each assembly being anchored upon corresponding left-hand and right-hand side frames of the shelter.

5. A storage terminal shelter side curtain assembly truck/trailer hinge gap closure comprising:
   a) at least one compressible hinge unit including opposed leaves, a first such leaf being anchored to a shelter side frame and a second leaf being free and articulable relative to the first leaf;
   b) compression-expansion means engaging the second leaf in opposition to the first leaf;
   c) at least one side curtain secured at a near end of the second leaf for movement, relative to the first, said curtain being reinforced laterally by stays extending from end to end of the curtain;
   d) a compression seal retained by the curtain on a far end thereof, said seal being resiliently movable relative to the curtain, whereby upon rearward displacement of the curtain by a truck/trailer a gap existing between trailer body and door will be closed relative to a dock of a terminal building.

6. The shelter curtain unit of claim 5, further comprising a fabric gap filler engaging opposed leaves of the hinge assembly in containment-expansion disposition, to effect closure of the gap created between respective leaves of the hinge assembly, upon actuation of the curtain.

7. The shelter side curtain unit of claim 6 wherein the second leaf includes an articulable leaf extension to which the side curtain is attached for coactive articulation, relative to the second hinge leaf, to compensate thereby for offset position of the truck/trailer, relative to the terminal dock.

8. The shelter side curtain assembly of claim 7, wherein plural hinge unit assemblies are disposed in vertical alignment, each being anchored relative to corresponding left-hand and right-hand frames of the shelter.

* * * * *